2,900,416

METHOD OF PREPARATION OF ALKYL-SUBSTITUTED PHOSPHINES

Robert D. Stewart, Whittier, and Ross I. Wagner, Pico, Calif., assignors to American Potash & Chemical Corporation, a corporation of Delaware No Drawing. Application February 21, 1956
Serial No. 566,759

4 Claims. (Cl. 260—606.5)

This invention relates to a process for the preparation of alkyl substituted phosphines. These compounds are known and various methods have earlier been suggested for their preparation. For example, according to one method of preparation (E. C. Evers, J. Am. Chem. Soc., 73, 2038, 1951), tetrasodium diphosphide was prepared by addition of a toluene solution of white phosphorus to an ammonia solution of sodium or other alkali metal such as lithium to prepare the tetralithium diphosphide. The tetrasodium diphosphide was then used for making phosphine and methyl phosphine (Evers et al., J. Am. Chem. Soc. 73, 5088, 1951).

According to another method, phosphines can be prepared by the reaction of a phosphonium halide with a base. By another method, the phosphine can be prepared by reduction of phosphorus trihalides with lithium aluminum hydride to give phosphine, which is then converted to the phosphinide ion by reaction with an alkali or alkaline earth metal in liquid ammonia solution according to the following, where M is a metal:

$$2PH_3 + 2M \rightarrow 2PH_2^- + 2M^+ + H_2$$

The alkyl phosphine is then prepared from the phosphinide ion by reaction with an alkyl halide in accordance with the following:

$$PH_2^- + RX \rightarrow RPH_2 + X^-$$

The process of the present invention provides an improvement over the foregoing methods. For example, as compared to the first preparation, our method does not require a solvent for the phosphorus, which is introduced into the reactor as a finely divided solid, thus simplifying the problem of separating the final product from the reaction mixture. Further, we employ more concentrated metal solutions. In addition, water is used as the acid in the reduction of the initial reaction product to phosphinide ion and, finally, all operations, from the initial introduction of the reactants to separation of the final product, are conveniently carried out in the same reactor without necessity of separation of any intermediate products.

As compared to the second preparation, the materials which we employ are less expensive and are more readily available. Further, in the preparation, phosphine need not be isolated as such, thereby reducing the time of processing and the hazard involved for phosphine is toxic and flammable.

Briefly stated, the method of our invention comprises the reaction in a suitable reaction vessel of finely divided solid phosphorus and a material selected from the group consisting of an alkali metal dissolved in a suitable solvent. When the reaction has proceeded to a desired degree, water and alkali metal are added to reduce the initial reaction product and form the phosphinide ion. The phosphinide can then be reacted with an organic halide to provide the desired phosphine. The reaction sequence can be represented as follows, where RX is an organic halide:

(1) $8Na + P_4 \rightarrow nZ$
(2) $nZ + 4nNa + 8nH_2O \rightarrow 4nPH_2^- + 12nNa^+ + 8nOH^-$
(3) $PH_2^- + RX \rightarrow RPH_2 + X^-$
(4) $2RPH_2 + 2Na \rightarrow 2RPH^- + 2Na^+ + H_2$
(5) $RPH^- + R'X \rightarrow RR'PH + X^-$ where Z represents undefined intermediate reaction products, R and R' are suitable organic substituents or hydrogen, and X represents a halogen, e.g., fluorine, chlorine, bromine or iodine.

While one can react an organic halide with the intermediate which exists after reaction (1), it is preferred to reduce this with water and additional alkali metal as in reaction (2) to increase the yield of phosphinide ion. In the intermediate, the phosphorus present has a valence of two and to provide valence three phosphorus for the phosphine, disproportionation must occur with an attendant reduction in yield; under these conditions, the yield can only be two-thirds of that which would be possible if the phosphorus was all valence three phosphorus. By further reducing the phosphorus with water and alkali metal, the phosphorus can all be converted into phosphinide ion and subsequently into the desired phosphine.

The reactions can easily be followed by color change. When reaction (1) is complete, the blue color of metal in solution is replaced by a red color. Alkali metal is then added to the reaction mixture in the ratio of one equivalent of metal per gram-atom of phosphorus and titrated with water to the disappearance of the blue color. At this time, if reaction (2) has gone to completion, the solution will be a yellow color and will contain a white precipitate. If the reaction is not complete, the solution will be orange or red and will contain a reddish precipitate. Additional metal must then be added.

The amount of metal required can be calculated as follows: Since reaction (2) calls for two moles of water per equivalent of metal, the difference between the actual moles of water used and the theoretical amount required is determined, and half this many equivalents of metal added to the reaction mixture. Water is then measured into the reaction mixture until the blue color disappears. If necessary, the procedure may be repeated until the red color has been entirely replaced by yellow.

In step (3) the alkyl halide is measured in until the reaction mixture is colorless. The product can then be removed as a monosubstituted phosphine or converted into a monosubstituted phosphinide ion by adding metal in reaction (4) in the ratio of one equivalent of metal per mole of halide used in step (3). Any excess of metal may be destroyed by water in the required amounts. At this point the solution should be orange with a white precipitate. The second alkyl halide is added in step (5) until the orange color disappears. Reaction is then complete.

Solvent is added during the course of the reaction to thin the mixture and wash down the walls of the vessel, as large quantities of solids, primarily alkali metal hydroxide and halide, are formed.

The step-wise addition of reactants is desirable to reduce the extent of side reactions; e.g., when ammonia is employed as a solvent, the formation of sodium amide is minimized.

As a solvent, one can employ any material which will dissolve an adequate quantity of the alkali metal and which is also substantially inert.

Once the phosphinide ion is available for reaction, one can employ an organic halide as a reactant to form the corresponding phosphine and a halide of the alkali metal. As suitable organic halides one can use an alkyl, alkenyl, alkynyl or arylalkyl halide; by halide we mean fluoride, chloride, bromide or iodide. By raising the temperature of the reaction mixture by pressurizing the reactor, as in Example I, many organic halides can be made to react that might not react, or which react slowly at lower temperatures.

The practice of the invention will become further apparent from the following examples which are set forth by way of illustration and not by way of limitation:

*Example I.*—n-Propylphosphine was prepared using as starting materials white phosphorus, sodium, ammonium bromide and n-propyl bromide in liquid ammonia solution without the preparation of phosphine as an intermediate. A 0.4714 g. (460.9 cc.) capsule of reagent grade sodium and 0.2117 g. (153.1 cc.) of white phosphorus (Na/P=3.01) were placed in an 85 ml. Pyrex bomb tube equipped with a break-off tip. Approximately 5 ml. of dry ammonia was added and the tube sealed under vacuum. The sodium capsule was broken mechanically and the tube was allowed to warm to room temperature. After 5¼ hours at room temperature and 66 hours at −78° C., the tube was cooled to −196°, opened, and 22.1 cc. of non-condensable gas (presumably hydrogen) removed. The ammonia was removed by distillation and 1.3239 g. (302.7 cc.) of ammonium bromide was added to the tube and two break-off tips were sealed on. The ammonia was then returned to the tube, which was sealed under vacuum and allowed to warm to room temperature. After 17½ hours, the tube was cooled to −196°, opened, and 131.8 cc. n-propyl bromide added. The tube was re-sealed under vacuum and allowed to warm to room temperature. After 92 hours at room temperature, the tube was opened, cooled to −78°, and a lower product layer of n-propyl phosphine amounting to approximately 0.5 ml. was separated mechanically from an upper ammonia layer of 5 ml. The lower layer was fractionated through a vapor take-off column with a −78° head to remove ammonia. The total product was 79.0 cc., a 60% yield.

The molecular weight, infrared spectrum and vapor pressure curve were determined for the product. The molecular weight was found by vapor density determination to be 77.78 (n-propyl phosphine=76.080). The vapor pressure equation was determined as $$\log_{10} P_{mm} = 7.8776 - 1629/T$$

from which the extrapolated boiling point was found to be 52.8° C. (lit. value 53–53.5°). The solids were analyzed for total bromide; found, 19.44 milli-moles Br⁻; calc., 19.40 milli-moles.

*Example II.*—Dimethylphosphine was prepared from sodium phosphinide resulting from the action of sodium on white phosphorus in liquid ammonia solution as described in Example I. The reaction was carried out on a larger scale and at a lower temperature e.g., −33°.

A 6.969 g. (5040 cc.) quantity of reagent grade white phosphorus was introduced into a 3-neck 500 ml. reactor containing a magnetic stirrer and 60 ml. of water at 50°. The liquid was stirred vigorously as the water cooled in a 0° bath. The dispersion of the phosphorus in this manner was quite inefficient but served to increase the surface area somewhat. The water was then removed under a nitrogen atmosphere and the phosphorus was partially dried with a total of six successive washes of acetone and anhydrous ether under a nitrogen atmosphere, then finally dried in a stream of nitrogen. Approximately 125 ml. of dry anhydrous ammonia was condensed in the reactor and 15.489 g. (15,090 cc.) of sodium added. The reactor was then fitted with a nitrogen inlet tube and a cold finger condenser vented through a mercury bubbler. After 17 hours at −30° and 47 hours at −78°, the sodium solution was titrated with 2.82 ml. water to the disappearance of the blue color. An 18 g. (1,900 cc.) quantity of methyl bromide was added and 15 ml. of condensate was collected in a liquid separatory apparatus. The lower product layer consisted of only 0.1–0.2 ml. The entire sample was returned to the reactor, which now contained a deep red solution, a pale yellow precipitate and considerable amounts of white and yellow solid deposited on the wall above the liquid level. The magnetic stirrer was removed and repaced by a direct-drive glass stirrer. An additional 4.83 g. (4,700 cc.) sodium was added and the ammonia level was raised approximately 1 cm. to bring the solution in contact with some of the solid on the vessel wall. The solution was stirred at reflux temperature for 13¾ hours and stored at −78° for 15 hours. The excess sodium was then titrated with an additional 2.70 ml. water. The red color disappeared and the solution turned yellow. An additional 18 g. (1,900 cc.) of methyl bromide was added discharging the yellow color. The reaction mixture was then distilled until the distillate was no longer two-phase. The lower liquid phase was then separated mechanically, and treated with anhydrous zinc sulfate at −78° to remove ammonia. The total volume of product was found to be 1,564 cc. (31.1% of the phosphorus recovered as methyl phosphines). The product was then fractionated through a vapor take-off column with a −97° head. Dimethylphosphine in the amount of 1,052 cc. (a 20.9% yield based on phosphorus) was recovered after removal of a head fraction of essentially pure methylphosphine.

In certain places in the examples preceding, following the gram quantities, a quantity in cubic centimeters (cc.) appears. It is common in high vacuum work to refer any given quantity of material, whether solid or otherwise, to an equivalent volume of gas at standard temperature and pressure. Given a quantity in moles, the cc. volume may be ascertained by multiplying this number by 22.4.

We claim:

1. A process for preparing a lower alkyl substituted phosphine comprising: forming a solution of at least one member from the group consisting of sodium and lithium in a substantially inert solvent therefor; adding thereto solid phosphorus in finely divided form; placing the solution so formed under an inert atmosphere; adding sufficient water to the reaction product so formed to replace the blue color of said reaction product with a red color; thereafter adding a member selected from the group consisting of sodium and lithium in an amount of approximately one equivalent per gram atom of phosphorus present in said solution whereby to cause the re-formation of a blue color; continuing said alternate addition of metal and addition of water until said solution precipitates out a reddish material and said solution becomes yellow whereby to form a phosphinide ion; and contacting the phosphinide ion so formed with a lower alkyl halide whereby to form said phosphine.

2. The process of claim 1 wherein said inert solvent is liquid ammonia.

3. A process for preparing a lower alkyl disubstituted phosphine comprising: forming a solution of at least one member selected from the group consisting of sodium and lithium in a substantially inert solvent therefor; adding thereto a quantity of solid phosphorus in a finely divided state; placing said solution so formed under an inert atmosphere; adding to said solution and the reaction product formed therein at least one member of the group consisting of sodium and lithium together with a quantity of water whereby to form a phosphinide ion; contacting the phosphinide ion so formed with a lower alkyl halide whereby to form a monoalkyl-substituted phosphine; contacting the product so formed with at least one member of the group consisting of sodium and lithium whereby to form a monoalkyl-substituted phosphinide ion; and thereafter contacting the product so formed with a lower alkyl halide whereby to form said disubstituted phosphine.

4. The process of claim 3 wherein said inert solvent is liquid ammonia.

References Cited in the file of this patent

UNITED STATES PATENTS 2,437,795    Walling _____ Mar. 16, 1948

OTHER REFERENCES

Dennis et al.: American Chemical Society Journal, vol. 16, pp. 478–479 (1894).

Jacobson: Encyclopedia of Chemical Reactions, vol. IV, Reinhold, N.Y. (1951), page 411.

Royen et al.: Chem. Abs., vol. 48, pp. 5706 (1954).